(12) United States Patent
Ganiere

(10) Patent No.: US 6,390,757 B2
(45) Date of Patent: May 21, 2002

(54) BAGGAGE SLIDE

(76) Inventor: Jeff Ganiere, 330 N. Spring Blvd., Tarpon Springs, FL (US) 34689

( * ) Notice: Subject to any disclaimer, the term of this patent is extended or adjusted under 35 U.S.C. 154(b) by 0 days.

(21) Appl. No.: 09/785,111

(22) Filed: Feb. 16, 2001

Related U.S. Application Data

(63) Continuation-in-part of application No. 09/183,058, filed on Oct. 30, 1998, now abandoned.

(51) Int. Cl.$^7$ .......................... B65G 67/04; B65G 67/24
(52) U.S. Cl. ...................... 414/391; 414/398; 414/571
(58) Field of Search .............................. 414/391, 395, 414/398, 399, 538, 571; 244/137.1; 193/4, 5, 6, 33; 14/71.5, 72.5

(56) References Cited

U.S. PATENT DOCUMENTS

| | | |
|---|---|---|
| 2,826,319 A | 3/1958 | Renner et al. |
| 3,176,334 A | 4/1965 | Lovedahl |
| 3,404,417 A | 10/1968 | Wollard et al. |
| 3,524,558 A | 8/1970 | Mastracci et al. |
| 3,827,590 A | 8/1974 | Lodjic |
| 3,843,987 A | 10/1974 | Lodjic |
| 4,035,861 A | 7/1977 | Edge |
| 4,318,198 A | 3/1982 | Drozd |
| 4,517,698 A | 5/1985 | Lamp'l et al. |
| 4,912,796 A | 4/1990 | Crump |
| 5,704,086 A | 1/1998 | Hansen et al. |
| 5,772,276 A | 6/1998 | Fetz et al. |
| 6,047,811 A | 4/2000 | Zittel et al. |
| 6,109,854 A | 8/2000 | Thompson, Jr. et al. |
| 6,120,234 A | 9/2000 | Dinverno |

FOREIGN PATENT DOCUMENTS

DE           1913799           10/1970

OTHER PUBLICATIONS

Jetlift, Passenger Boarding Equipment Lift brochure, Jetlift Terminal Service, Henefer, Utah, 6 pages, date unknown.*
Photograph of Baggage Slide, undated.
Page from GSE Today, Jun/Jul. 1998 issue.
Page from Scientific American, Mar. 1945 issue.

* cited by examiner

*Primary Examiner*—James W. Keenan
(74) *Attorney, Agent, or Firm*—Dennis G. LaPointe; Mason & Associates, PA

(57) ABSTRACT

A baggage slide attached to a movable elevated passenger walkway/bridge.

19 Claims, 10 Drawing Sheets

BAGGAGE SLIDE

RELATED APPLICATION

This application is a continuation-in-part of U.S. Pat. application Ser. No. 09/183,058, filed Oct.10, 1998 now abandoned.

BACKGROUND OF THE INVENTION

1. Field of the Invention

The present invention relates generally to baggage handling, and more specifically to an inclined baggage slide coupled to an elevated aircraft passenger bridge.

2. Description of Related Art

The use of a baggage slide outside the service door of the passenger loading bridge is to transfer baggage to the cargo loading area from the elevation and area directly adjacent to the passenger entrance to the aircraft.

Owing to a growing trend among air travelers to carry their baggage onboard instead of checking it through at the ticket counter, overhead storage locations on aircraft can become dangerously overburdened. The FAA has guidelines restricting the size and number of pieces of carry-on luggage allowed, which the agency is urging the airlines to enforce. This baggage slide allows flight attendants and ground crews to swiftly and accurately handle overflow baggage without causing aircraft to sustain ground delays.

In addition, in many situations disabled persons are not required to give advance notice to the airlines of their special needs, and frequently arrive for boarding at the passenger loading bridge in wheelchairs. The wheelchairs must be quickly checked as cargo after the disabled person has boarded the aircraft. Hence, there is a need for a baggage slide capable of quickly and efficiently delivering baggage and other cargo, such as wheelchairs, to the cargo loading area. The present invention satisfies this need.

U.S. Pat. No. 6,109,854 to Thompson, Jr. et al. discloses a ramp in an attempt to solve the above described problems. However, this baggage slide has several inherent deficiencies which limit its use due to its structure and method of attachment. Specifically, the Thompson slide has several limitations that limit its ability to accommodate the height the bridge has to be elevated to in turn accommodate the bridge connection to the aircraft access door. Thompson discloses a ramp which has an inclined portion starting at the tarmac at its lower end and terminating at the upper level first stair. The ramp is fixed to the employee auxiliary access stairway at at least two locations, one being at the top of the riser of the first step and the other being at the leading edge area of the stairway upper level platform.

From a safety standpoint, this creates shear loading and stress on the stairway assembly which could cause an accident whereby the ramp and stairway assembly separate from the bridge frame and fall to the ground.

In addition, where the Thompson device is connected to the stairway upper level platform at at least two points, the pivot point for the inclined portion is by necessity located near the top of the first step riser. Should a Boeing 757 or 777 then be parked at the terminal gate, the bridge may have to be elevated. In such a case, the ramp inclination angle changes rapidly and the angle is found to be too steep. That is the formed hypotenuse of the inclined portion of the ramp is relatively short in comparison to the present invention and any elevation change quickly affects the steepness of the incline.

The present invention overcomes this deficiency because, as described in more detail below, the attachment is independent of the stairway assembly and the ramp instead attaches directly to the framework of the bridge assembly. No additional load is applied to the stairway as a result of the ramp weight itself or in combination with the weight of objects sliding down the ramp. Further, the attachment point which is also the pivotal point is near an underneath surface of the stairway landing platform but at its leading edge closest to the aircraft, thereby resulting in a longer inclined portion or formed hypotenuse. Now when the bridge needs to the elevated, the longer inclined ramp can be elevated without dramatically changing the slope of the incline.

In addition, because the present invention is a continuously inclining ramp, as opposed to the flat upper level fixed platform of the Thompson reference, the first upper level segment of the present invention ramp continues its incline. This provides a further ergonomic benefit to baggage handlers as the upper end of the incline is at a higher elevation such that a baggage handler need not bend down as far to place an article onto the ramp. The upper end of the incline is in effect closer to a height between the waist and knees of a typical handler.

SUMMARY OF THE INVENTION

The present invention is a baggage slide for a movable elevated passenger walkway/bridge having attached to said movable elevated passenger walkway/bridge an auxiliary access stairway extending downwardly on an incline from the movable elevated passenger walkway/bridge to the tarmac. The auxiliary access stairway has an upper portion landing platform for facilitating access for airline service employees to and from the elevated passenger walkway/bridge from and to the tarmac.

More specifically, the inventive baggage slide comprises a baggage slide support member attached to a movable elevated passenger walkway/bridge and extends from said elevated passenger walkway/bridge near a leading edge and near an underneath side of an auxiliary access stairway's upper portion landing platform. The baggage slide support member further laterally extends beyond the auxiliary access stairway's upper portion landing platform a sufficient length to pivotally couple a loading end of an inclined modular ramp assembly.

The inclined modular ramp assembly includes an unloading end for resting on a tarmac surface with a generally planar conveyance surface extending between the unloading end and the loading end for the sliding conveyance of an article from the loading end to the unloading end. The inclined modular ramp assembly is disposed near and generally parallel to the auxiliary access stairway.

The inclined modular ramp assembly further includes upstanding wall members generally along each edge of the generally planar conveyance surface. The upstanding wall members are means for preventing the sliding article from falling off the generally planar conveyance surface.

The loading end of the inclined modular ramp assembly preferably has side access means for loading the article from the auxiliary access stairway's upper portion landing platform onto the inclined modular ramp assembly, while the unloading end of the inclined modular ramp assembly has side access means for removing the article from the inclined modular ramp assembly.

In a typical application of the invention, the unloading end of the inclined modular ramp assembly further comprises an article stop extending substantially across the inclined modular ramp assembly with the article stop further being located downstream of the side access means for removing the article from the inclined modular ramp assembly. The article stop is adapted to absorb the impact shock of the sliding article. For example, the article stop typically may be a rubber reinforced gate.

The inclined modular ramp assembly typically comprises a loading segment, an unloading segment and at least one intermediate segment there between.

The generally planar conveyance surface comprises a longitudinally oriented channel corrugated surface defining rain water runoff paths between upper surfaces of the channel corrugated surface.

The side access means for loading the article from the auxiliary access stairway's upper portion landing platform onto the inclined modular ramp assembly includes a first segment for funneling the article to said loading end. The first segment has a width gregreater than a corresponding width of the unloading end.

In an additional embodiment of the invention, the inclined modular ramp assembly further includes a shell for covering at least a portion of the inclined modular ramp assembly.

In another embodiment of the invention, the inclined modular ramp assembly comprises one or more segments of predetermined length each, wherein each segment is adjustable in length so as to maintain a substantially constant ratio between a height of the loading end from the tarmac surface and a length of the inclined modular ramp assembly.

Of course, the inclined modular ramp assembly may comprise a loading segment, an unloading segment and a plurality of intermediate segments there between, where the plurality of intermediate segments have at least two different lengths.

For facilitating relative movement along the tarmac as the bridge is elevated somewhat to adjust to specific aircraft configurations, the unloading end preferably has ground engagement wheels coupled to the inclined modular ramp assembly at said unloading end.

For items that need to be lowered carefully or for items htat need to be elevated from the tarmac to the aircraft, winch means located at the loading end for the controllable lowering of the article down the inclined modular ramp assembly and for the transfer of the article up the inclined modular ramp assembly, may be incorporated.

For weather protection, the inclined modular ramp assembly may include a shell for covering a substantial portion of the inclined modular ramp assembly.

The longitudinally oriented channel corrugated surface also provides for a reduced friction thereby enhancing the sliding of the article down the inclined modular ramp by causing only the upper surface of the longitudinally oriented channel corrugated surface to be in direct contact with the article as the article slides down the inclined modular ramp.

The loading segment typically comprises a platform portion and a connecting portion for connecting the platform portion to the at least one intermediate segment, wherein the platform portion and the connecting portion form an obtuse angle. Similarly, in the embodiment with the plurality of intermediate segments, the loading segment comprises a platform portion and a connecting portion for connecting the platform portion to the plurality of intermediate segments, wherein the platform portion and the connecting portion form an obtuse angle.

Related objects and advantages of the present invention will be apparent from the following description.

DETAILED DESCRIPTION OF THE INVENTION

Figure 1:
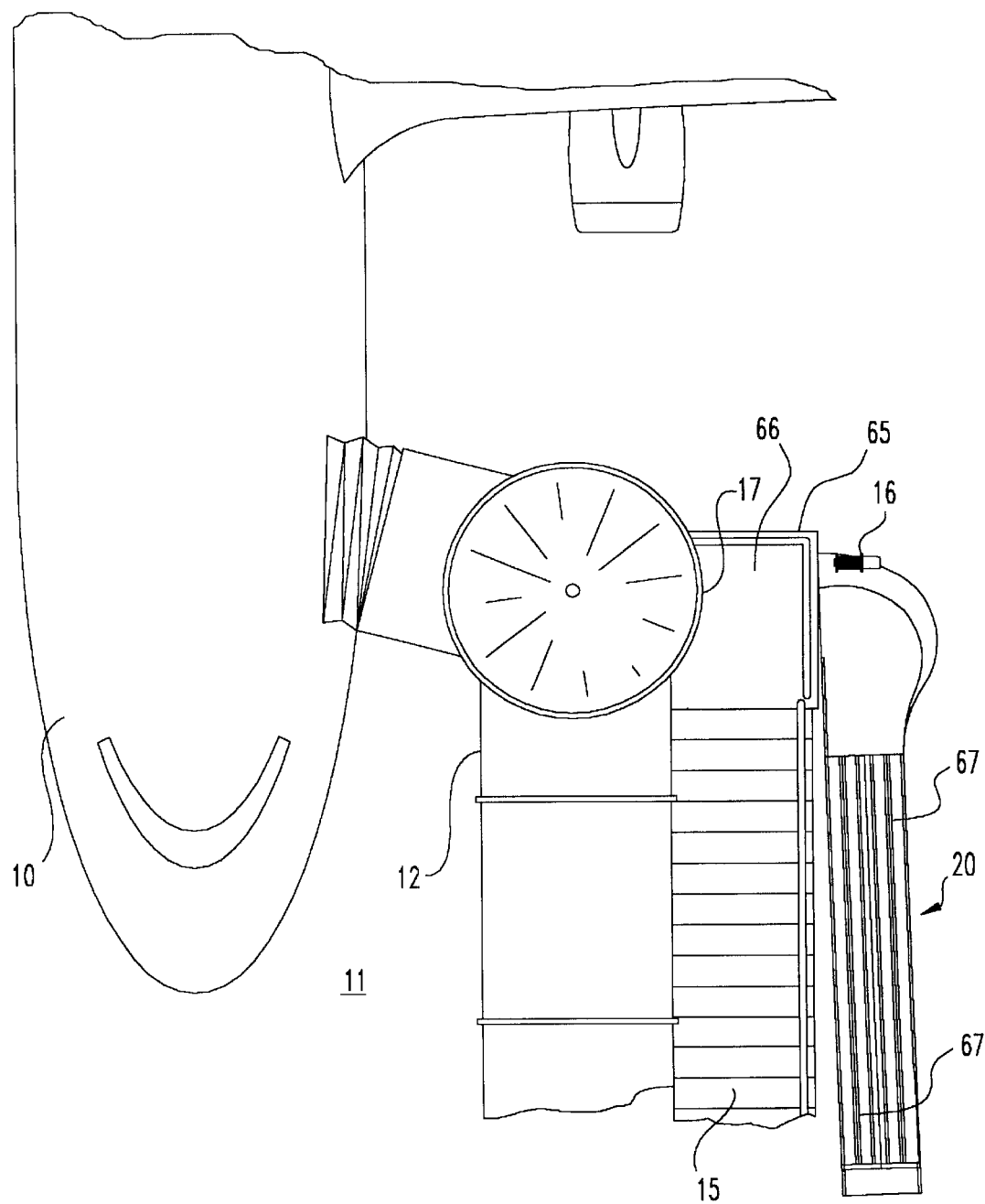
FIG. 1 is an illustrative plan view of a baggage slide of the present invention coupled to a passenger bridge connecting to an aircraft.

For the purposes of promoting an understanding of the a principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
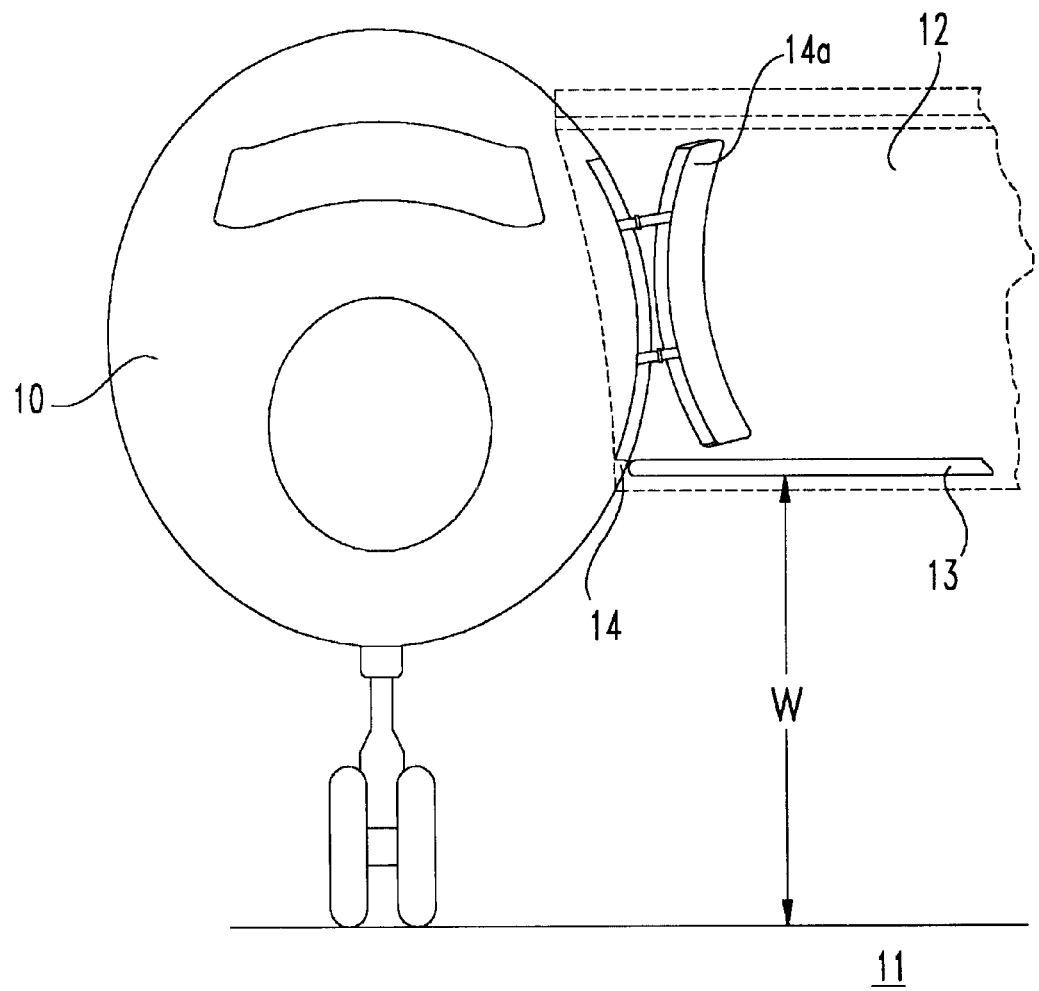
FIG. 2 is an illustrative view of a walkway surface comprising a portion of the passenger bridge of FIG. 1 positioned adjacent the door of the aircraft.

Referring to FIGS. 1 and 2, there is illustrated an aircraft 10 having a moveable substantially enclosed elevated passenger walkway/passenger bridge 12 leading to the passenger entrance 14 of the aircraft. The entrance 14 is defined where the entry hatch/door 14a is located in the fuselage of the aircraft. The passenger walkway/passenger bridge 12 includes a walkway floor 13 that is aligned with the entrance 14 and allows the passage/boarding of people into and out of the aircraft 10. There are many models of aircraft and the elevation of the entrance 14 above the ground/tarmac, as indicated by "W", often varies between the models. For example, the elevation of the passenger entrance to of the DC-9 is about 9 feet, the Boeing 757 is about 13 feet 4 inches and the Boeing 747 is about 17 feet 7 inches. The moveable passenger bridge/elevated walkway 12 is adjusted to bring the walkway floor 13 to the proper elevation to service the particular model of aircraft. Further, an auxiliary access stairway 15 and other items associated with the entrance 14 of the aircraft 10 must also be adjusted to the elevation associated with the particular model of aircraft.

The baggage slide 20 is designed and constructed to enable articles 21 to be transported from the elevated passenger walkway/bridge 12 to the ground/tarmac 11. The term articles as utilized herein include one or a plurality of items such as but not limited to baggage, cargo, packages, gifts, and/or wheelchairs. Owing to size restrictions for "carry on" articles and the amount of available storage space within the passenger cabin, many articles must be removed from the elevated passenger walkway/passenger bridge 12 and transferred to the cargo hold of the aircraft 10. For example, a passenger boarding the aircraft 10 through the elevated passenger walkway/passenger bridge 12 may be required to store some of their "carry on" articles in the airplanes cargo hold and may do so by giving the "carry-on" article to an attendant. The article is then moved from the walkway/passenger bridge 12 through an exterior door 17 of the elevated walkway 12 to the baggage slide 20 for movement to the ground/tarmac 11 and subsequently loaded into the cargo hold of the aircraft.

A mechanism or winch means 16 is coupled to the baggage slide 20 and adapted to controllably lower an article down the baggage slide 20. More particularly, the mechanism 16 is adapted to controllably lower and/or raise large, bulky, and or heavy articles such as but not limited to a wheelchair. The mechanism is typically a winch which is mounted to the baggage slide 20. However, another embodiment of the baggage slide of the present invention contemplates that there is no mechanism 16, or that the mechanism is coupled to the elevated walkway 12 or the auxiliary access stairway 15 or some other structure. Further, it should be understood that some articles may be assisted in their descent by mechanism 16, and other articles may be left to slide freely down the baggage slide 20.

Figure 3:
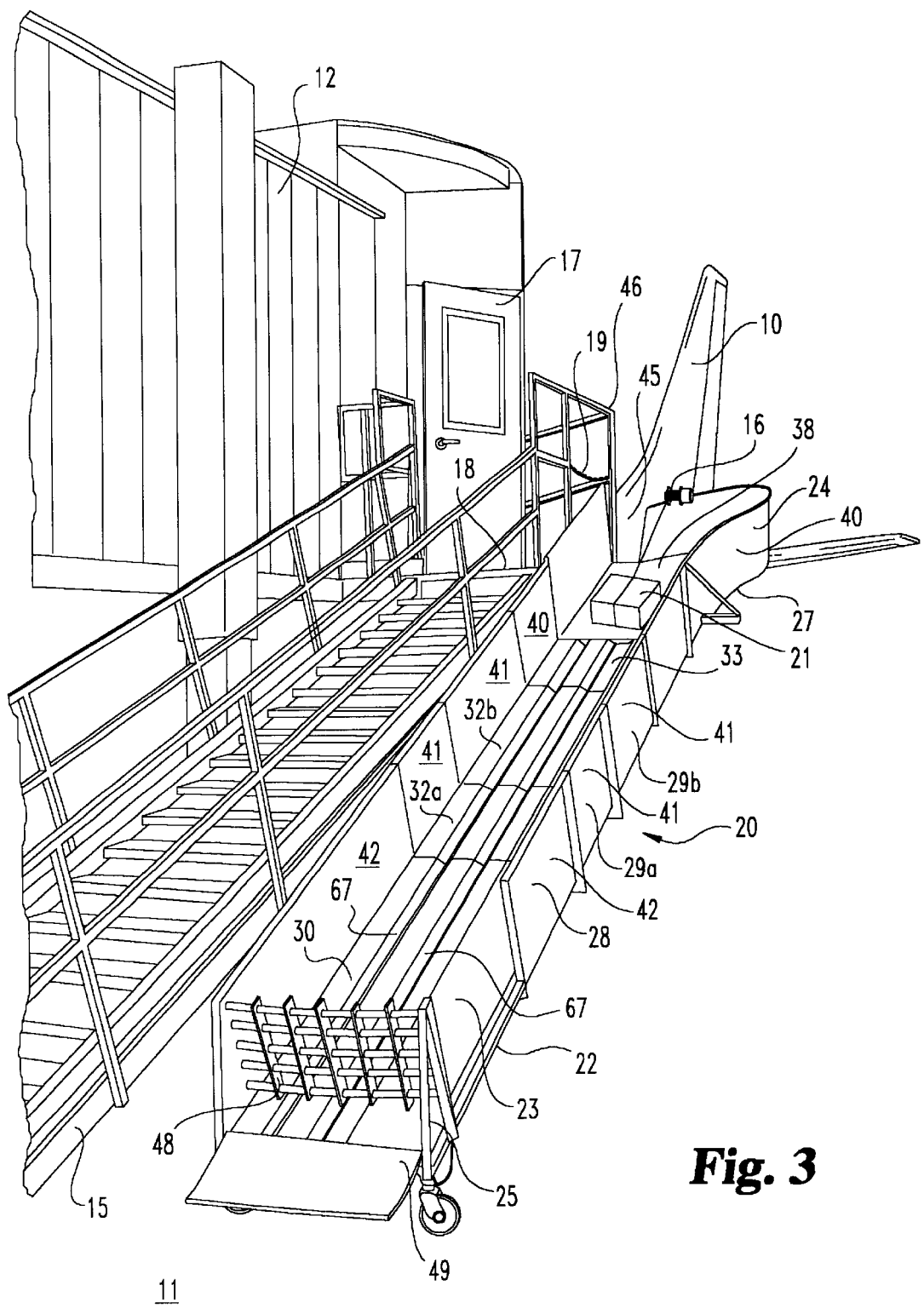
FIG. 3 is a perspective view of the invention near a service stairway part of the bridge.

With reference to FIG. 3, there is illustrated a perspective view of one embodiment of the baggage slide 20 in position for receiving an article 21 from the elevated passenger walkway/passenger bridge 12. Baggage slide 20 includes an inclined ramp 22 having a substantially planar conveyance surface 23 for the passage of articles from a loading end 24 to an unloading end 25. As shown in FIGS. 1 and 3, the baggage slide 20 is typically disposed in a substantially parallel relationship to and adjacent the auxiliary access stairway 15. The baggage slide 20 includes a plurality of modular segments including a top modular segment 27, a bottom modular segment 28 and at least one intermediate modular segment 29 connecting therebetween. While the embodiment illustrated in FIG. 3, includes a pair of intermediate modular segments 29a and 29b, it is understood herein that the number of intermediate segments 29 is not limited to a pair and can comprise one or more. The intermediate segments 29 may all be of the same length, or they may be of different lengths, and preferably each intermediate segment 29 is selected from a plurality of intermediate segments 29 having a variety of predetermined lengths. Each of the modular segments 27, 28 and 29 has substantially the same width, depth and cross-sectional shape as the modular segment adjoining it. The modular segments 27, 28 and 29 include a respective floor member 33, 30 and 32 that defines a portion of the conveyance surface 23. In one embodiment the floor members 33, 30 and 32 are formed of corrugated sheet metal, the corrugated sheet metal having a plurality of channels extending along the length of the conveyance surface 23. However, other materials for the floor member are contemplated herein. Further, in an alternate embodiment, the floor members have means for providing a drain so as to allow water to pass through the conveyance surface 23. The corrugated channel forming the conveyance surface provides for drainage of rain water along the valleys of the channels as depicted as 67 in FIGS. 1 and 3. An additional benefit to using a corrugated channel is that the upper surface of the conveyance surface has less surface area in direct contact with a sliding article, thereby lessening the amount of surface area friction between the article sliding down the inclined ramp and the ramp surface. This benefit resultantly enhances and facilitates the sliding of the articles down the ramp.

Modular segments 27, 28 and 29 include floor members 33, 30, 32 and upstanding wall members 40, 42 and 41 respectively. The upstanding wall members are designed to minimize the instances of articles falling off the conveyance surface along its length. A preferred cross-section of the segments is substantially rectangular. In one embodiment each of the modular segments has a floor member width of about 27 inches and the upstanding wall members extend about 20 inches from the floor member. Therefore, a channel having a cross-section with a width of about 27 inches and a depth of about 20 inches form one embodiment of the conveyance passageway. However, other geometric cross-sections and dimensions as may be desired for specific application are contemplated herein.

Figure 4:
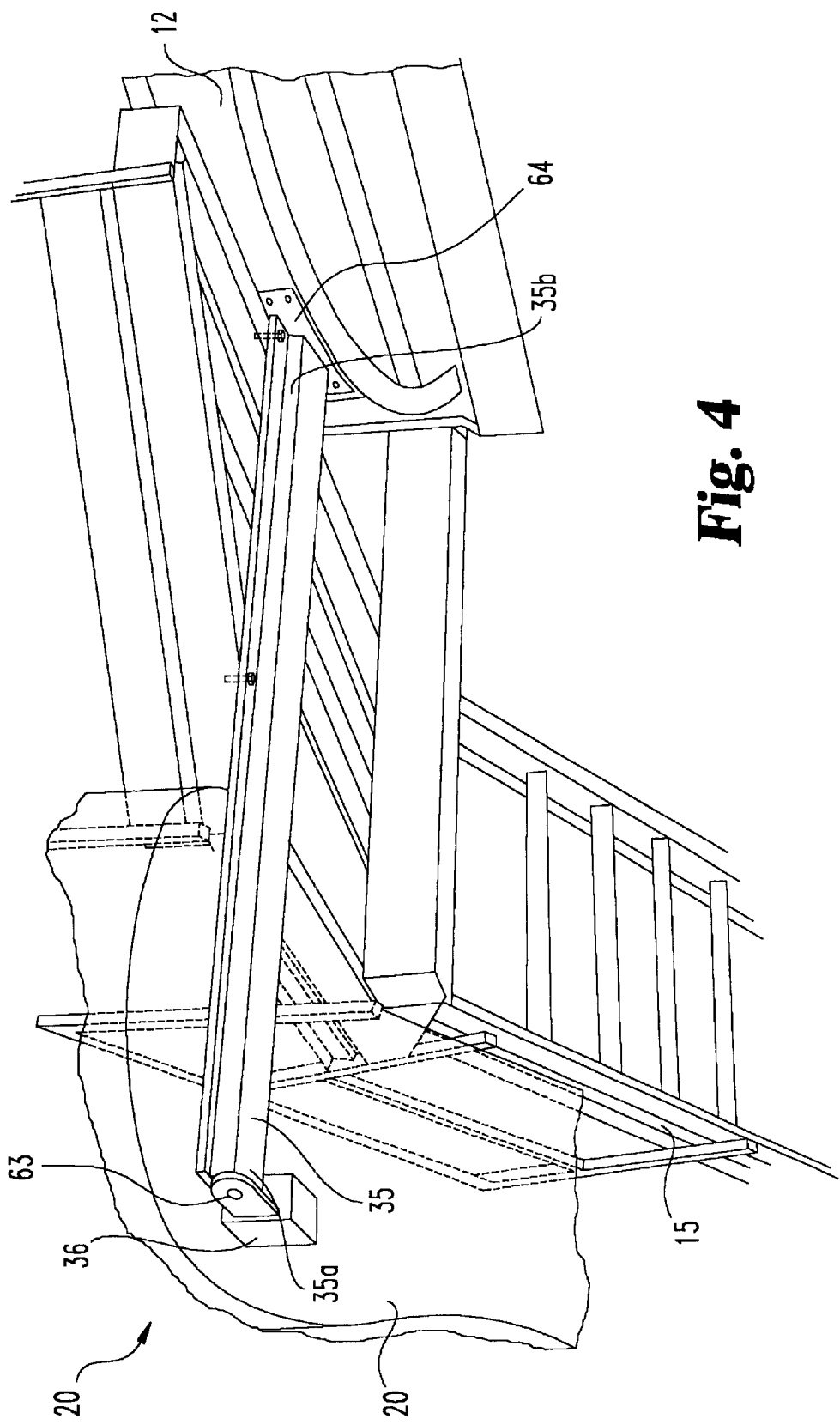
FIG. 4 is a partial perspective view of a supporting structure of the invention.
Figure 5:
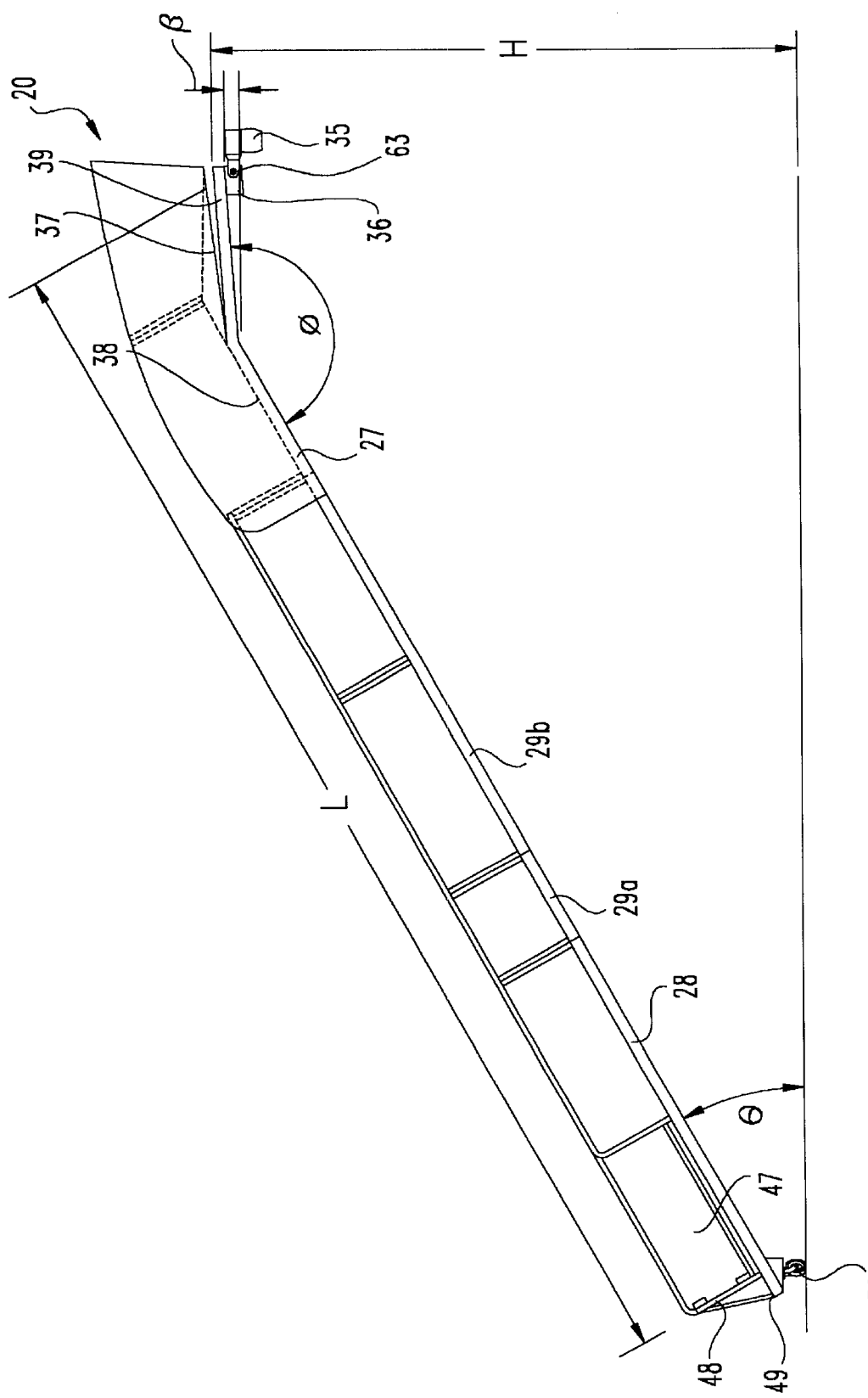
FIG. 5 is a side elevational view of the invention.
Figure 5A:
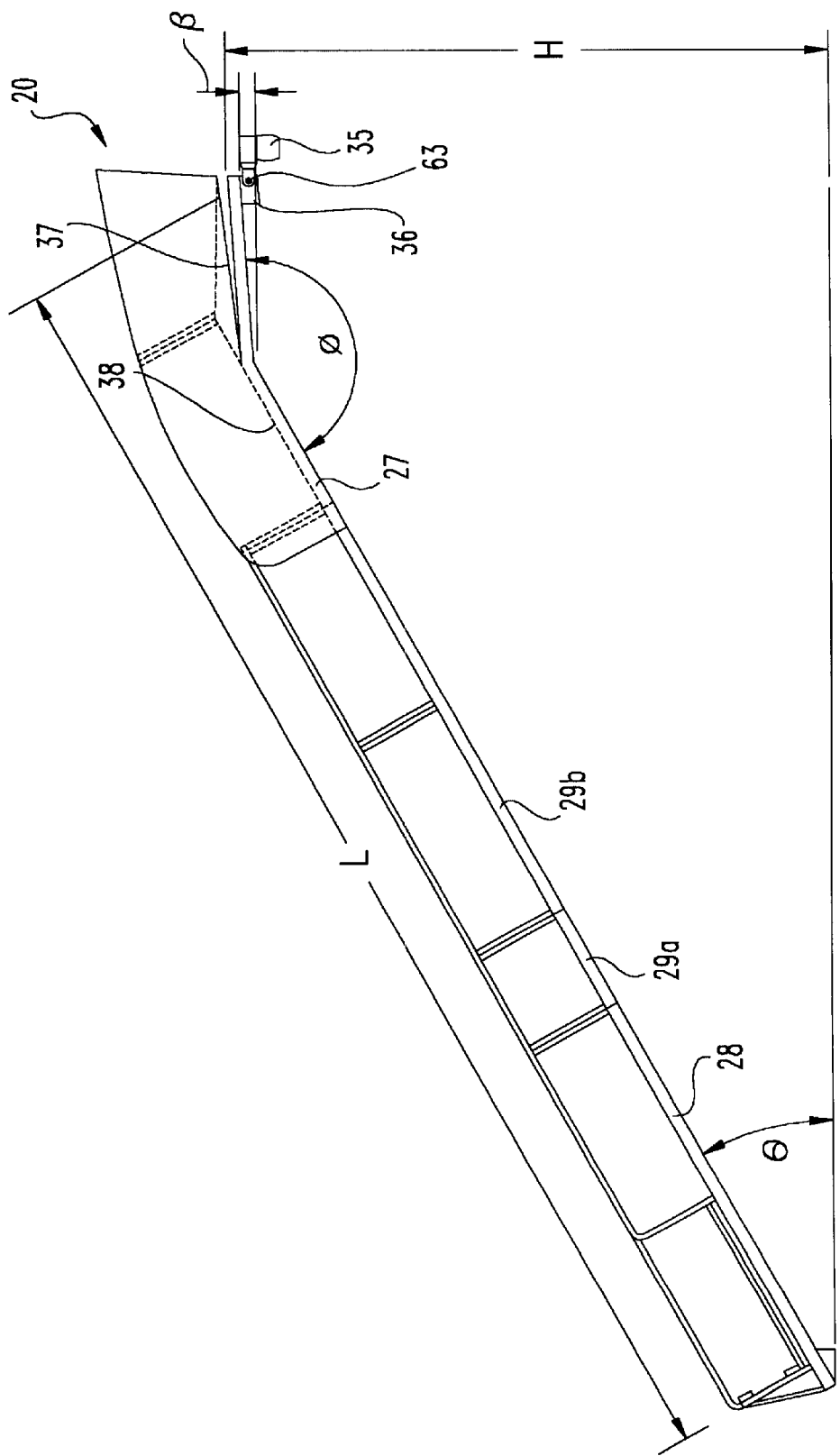
FIG. 5A is a side elevational view of an alternate embodiment of the invention.

With reference to FIG. 4, there is illustrated one embodiment of the baggage slide support structure for mounting the baggage slide 20 relative to the elevated walkway 12. A support member 35 is pivotally coupled between the baggage slide 20 and at least one of the access stairway 15 and the elevated passenger walkway/bridge 12. Preferably, the support member 35 is coupled to the elevated passenger walkway/bridge 12 near the door 17, and proximate a leading edge 65 of the auxiliary access stairway 15 landing platform 66, and provides a cantilevered structure for receiving the baggage slide 20 about pivotal attachment point 63 as shown in FIGS. 4, 5 and 5a. A typical connection would be a flanged connection as shown as shown in FIG. 4, at 64. The pivotal attachment point 63 allows for minor elevational adjustment of the movable passenger walkway/bridge 12.

One end of the support member 35 is coupled to a mounting bracket 36 located on the underside of the top modular segment 27 and the other end of the support member 35 is coupled to a portion of the structure forming the elevated passenger walkway/bridge 12, generally underneath the frame structure of the auxiliary access stairway 15 landing platform 66 or preferably to the elevated passenger walkway/bridge 12 itself so no additional loading stresses are applied to the auxiliary access stairway 15 and its landing platform 66. The support member 35 in alternate embodiments may be coupled to a different portion of the top modular segment 27 or one of the intermediate modular segments 29.

The support member 35 is formed of conventional structural material, such as steel, aluminum, fiber-reinforced polymeric material or combinations thereof, capable of supporting the weight of the baggage slide 20 and the articles to be passed thereon. The support member 35 and the baggage slide 20 are preferably coupled together with the elevated walkway 12 by mechanical fasteners. In a preferred embodiment, the mechanical fasteners define a bolted connection. Thus, the baggage slide 20 can be deployed for use with an elevated walkway/passenger bridge 12 without the necessity to expose the aircraft to welding, brazing or other high temperature procedures.

With reference to FIG. 5, there is illustrated a side elevational view of the baggage slide 20. The plurality of modular segments 28, 29 and 27 are coupled together to form a passageway for gravity conveyance from the elevated passenger walkway 12 to the tarmac/ground 11. The elevation required for the baggage slide loading end 24 is determined by the model of aircraft, and more specifically the elevation 'H' associated with its entrance. The length 'L' of the ramp can be adjusted by changing the number and or length of the intermediate modular segments 29. Selection of the appropriate quantity and length for the intermediate modular segment 29 will enable a constant ratio to be maintained between the elevation 'H' and the ramp length 'L'. This relationship is related through the common trigonometric function of $\sin \theta = H/L$. Through the changes to the intermediate modular segments, the ratio can be maintained at a desirable value while maintaining a substantially continuing incline of the baggage slide 20 as depicted in FIGS. 3, 5, 5a, 6 and 8. As mentioned above, once the ramp overall length has been determined for a particular use at a terminal gate, the ramp slope may still be affected with slight elevating or lowering of the bridge 12. However, by having the pivotal point 63 located proximate the leading edge of landing platform 66, the ramp 20 typically will be longer than a ramp attached to the stairway riser area and as such, when the bridge 12 is elevated or lowered, the unloading end will roll along the tarmac 11 but the slope change insignificantly impacts the sliding of any articles.

One form of the top modular segment 27 includes a platform portion 37 and a connecting portion 38 that are formed at an obtuse angle ø as depicted in FIG. 5. The platform portion 38 has a planar platform floor member 29 that adjoins the planar connecting floor member 38. The connecting portion 38 is aligned with the intermediate modular segments 29 and when in position for conveying an article down the passageway is oriented at an acute angle θ to the ground/tannac 11. The acute angle β preferably at least about 17 degrees. The platform portion 38 is inclined at an acute angle β. To facilitate the maintenance of a proper slope or to facilitate minor adjustments to the height of the passenger walkway/bridge 12, the attachment point 63 is typically fastened in such a way as to allow some degree of pivoting as discussed above. An inlet 45 (see FIG. 3) allows for the passage of articles to the platform portion 38 at or above the elevation of the deck 18 of the access stairway 15. The inlet defining a side entrance for moving articles to the conveyance surface. A removable member 19 (see FIG. 3) allows for larger articles to be passed through the safety railing 46. In one form the removable member 19 is defined by a chain.

The bottom modular segment 28 has an outlet 47 adapted for the removal of articles from the baggage slide 20. In the preferred form of the baggage slide 20 the outlet 47 is on the side of the ramp so as to allow side unloading of articles. The bottom modular segment 28 also includes a stop portion 48 that is offset from the outlet 47 and prevents the conveyance of articles off the distal end 49 of the baggage slide 20. In one embodiment the stop portion 48 will give, that is, act as a shock absorber, so as to not impart shock loading to an article coming down the conveyance surface 23. In a preferred form a mesh gate defines the stop portion 48. Several shock absorbing materials are known in the art and suitable for use as a shock absorbing gate such as reinforced rubber sheet material, bungy cords, among other materials. The baggage slide 20 includes a set of ground engagement wheels 50 for allowing easy movement along the ground/tarmac 11. With reference to FIG. 5A there is illustrated an alternate embodiment of the baggage slide that is substantially identical and like features will have like feature numbers. The distinction between the embodiment of FIG. 5 and FIG. 5A is that the embodiment of FIG. 5A has a fixed ground engagement device.

Figure 6:
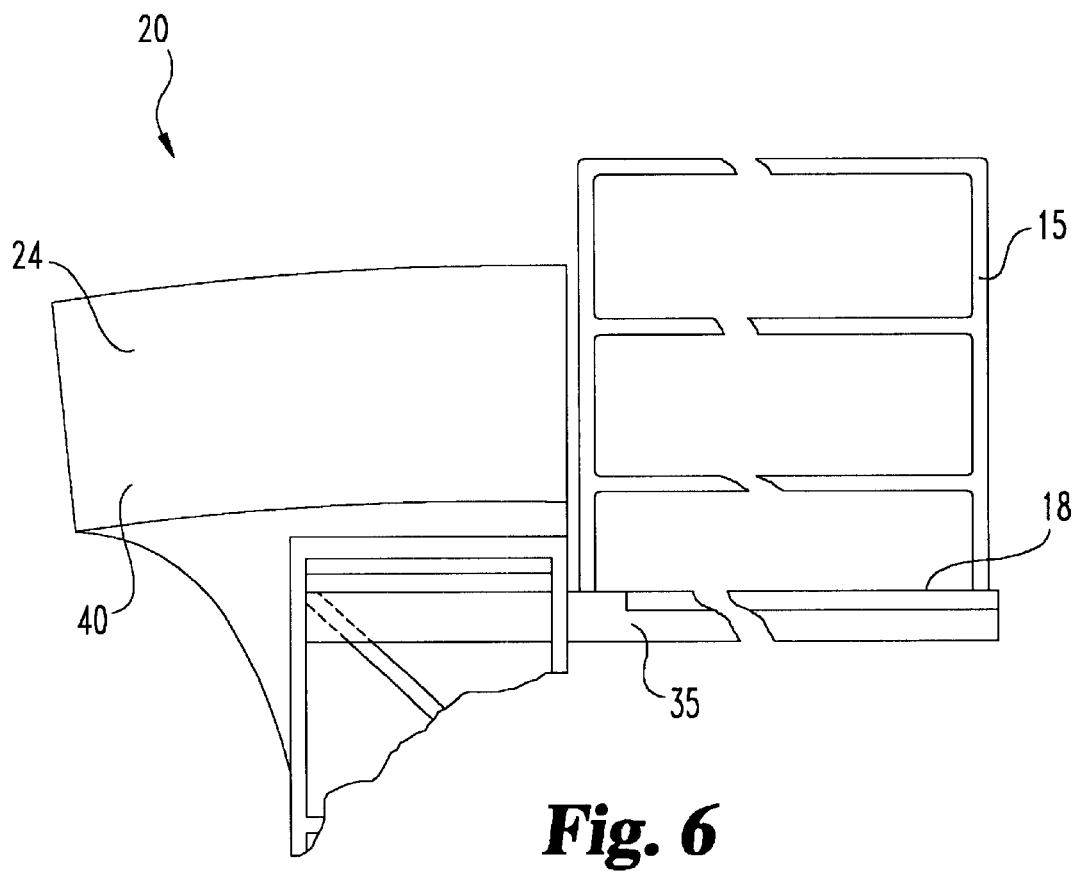
FIG. 6 is a rear elevational view of the invention.

With reference to FIG. 6, there is illustrated a partial rear elevation view of the baggage slide 20. The loading end 24 being adjacent the platform 18 of the auxiliary access staircase 15.

Figure 7:
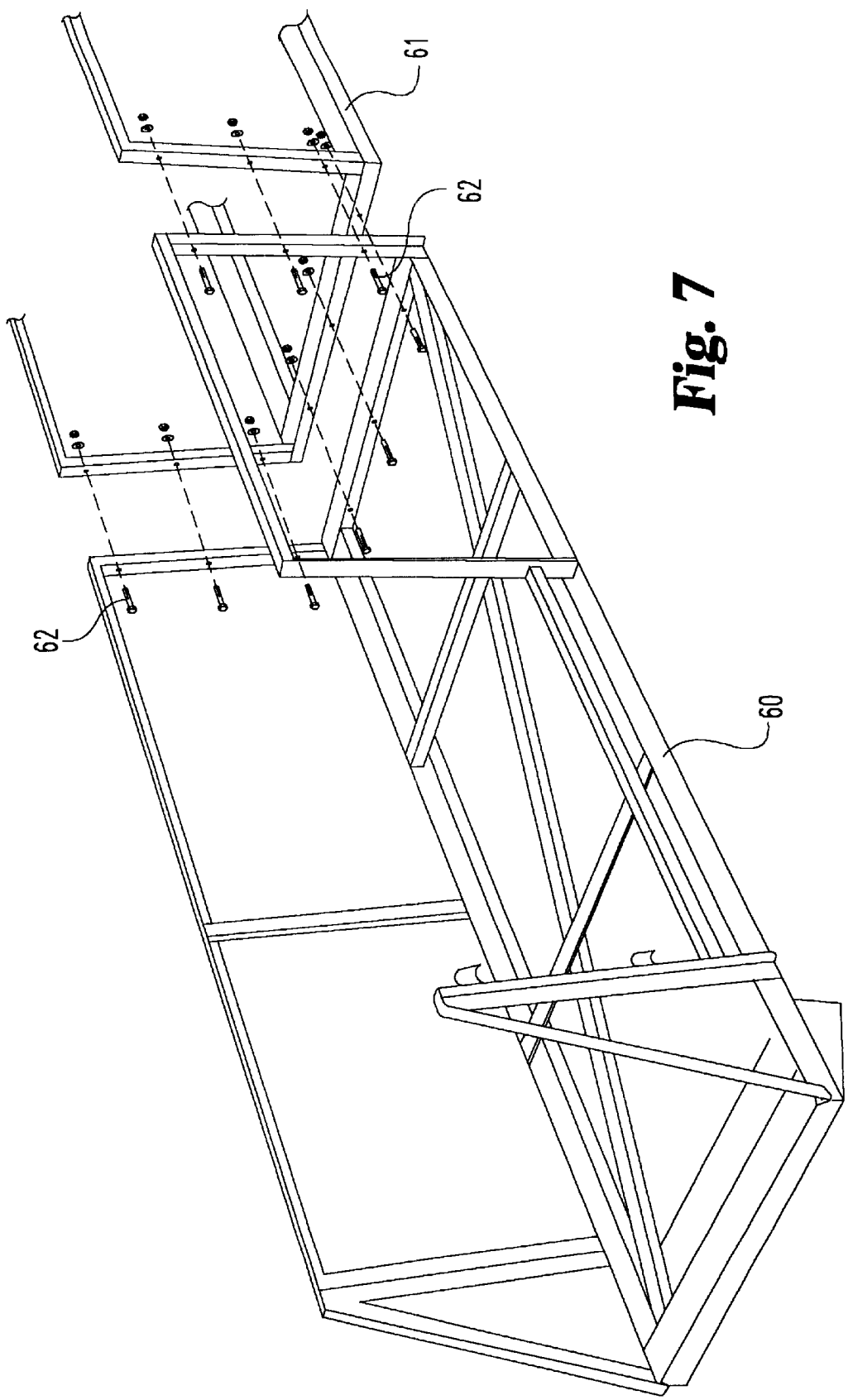
FIG. 7 is a partial exploded view of two adjoining modular structural segments which comprise a portion of the invention.

The platform 18 providing a pathway for the movement of the articles by an attendant to the baggage slide 20. The support member 35 is coupled to the baggage slide 20 to support at least a portion of the top modular portion to the elevation of the platform 18. Upstanding wall member 40 wraps around the platform portion 37. Further, in the preferred embodiment the loading end 24 including platform portion 38 has a width greater than the width of the unloading end 25. With reference to FIG. 7, there is illustrated an exploded view of two modular segments coupled together with fasteners. For illustrative purposes, the bottom segment supporting structure 60 is shown coupled with an intermediate segment supporting structure 61. A plurality of fasteners 62 join the two supporting structure segments 60 and 61 together, and preferably define a threaded fastener such as a bolt and nut or a threaded stud and nut. These supporting structures are not intended herein to be limiting and other structures having the required mechanical properties are contemplated herein.

Figure 8:
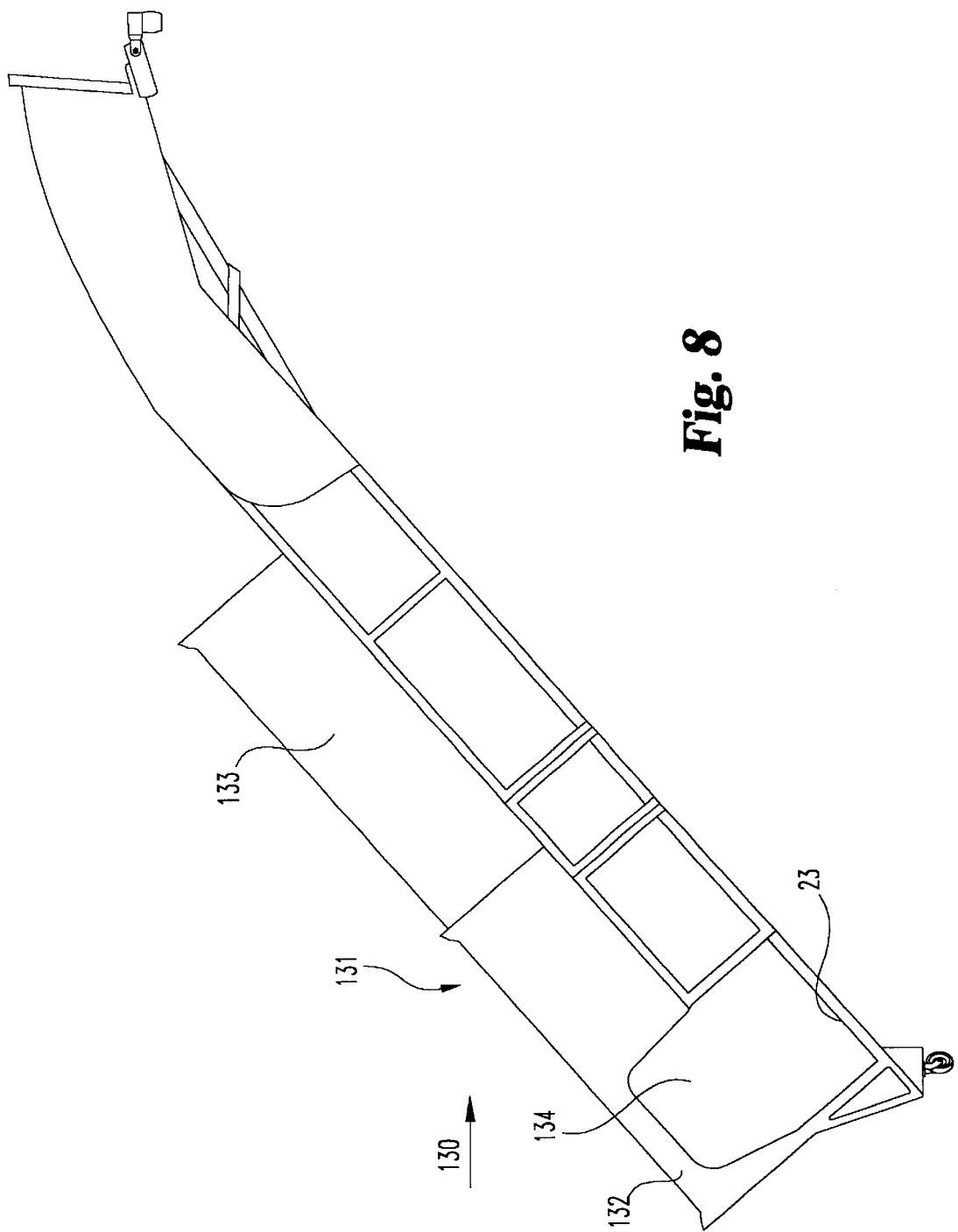
FIG. 8 is a side elevational view of another embodiment of the invention including a cover for the conveyance surface.
Figure 9:
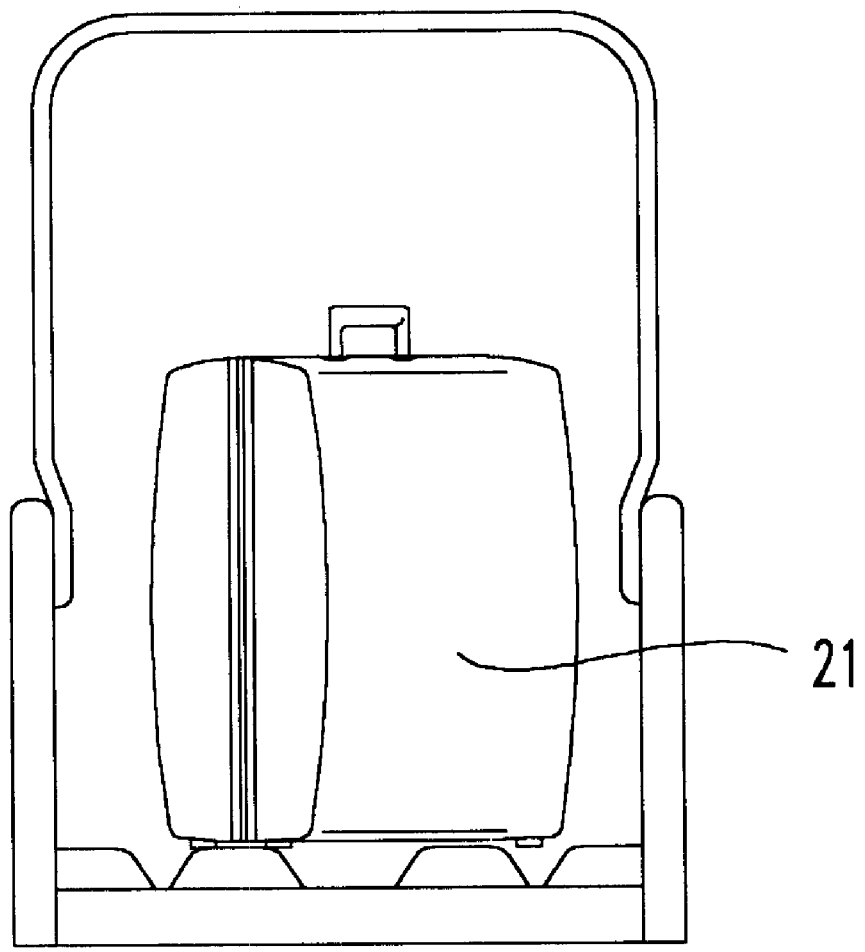
FIG. 9 is an illustrative view of an article sitting on a conveyance surface and covered by the cover.

With reference to FIGS. 8 and 9, there is illustrated another embodiment of the baggage slide system of the present invention. Baggage slide 130 is substantially similar to the baggage slide 20 and like feature numbers will be utilized to describe like features. The primary distinction between baggage slide 20 and baggage slide 130 relates to an environment protection shell 131 covering at least a portion of the conveyance surface 23. The shell 131 being of a modular design and includes a bottom shell 132 and at least one intermediate shell 133. The bottom shell 132 having an entrance 134 that corresponds with the outlet 47 so as to facilitate convenient side access to articles that have been conveyed down the baggage slide 130. The modular segments 132 and 133 forming the shell may be fastened to the upstanding walls of the baggage slide with an interference fit or by a fastener connection. Further, the shell segments are made out of materials that can withstand hostile environment factors. One type of material is a plastic reinforced with fiberglass, although any lightweight weatherproof material may be selected. in an alternate embodiment a retractable canopy is mounted to the baggage slide for providing environmental protection on an as needed basis.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A baggage slide for a movable elevated passenger walkway/bridge having attached to said movable elevated passenger walkway/bridge an auxiliary access stairway extending downwardly on an incline from the movable elevated passenger walkway/bridge to the tarmac, the auxiliary access stairway having an upper portion landing platform for facilitating access for airline service employees to and from the elevated passenger walkway/bridge from and to the tarmac, the baggage slide comprising:

a baggage slide support member attached to a movable elevated passenger walkway/bridge and extending from said elevated passenger walkway/bridge near a leading edge and near an underneath side of an auxiliary access stairway's upper portion landing platform, the baggage slide support member further laterally extending beyond the auxiliary access stairway's upper portion landing platform a sufficient length to pivotally couple a loading end of an inclined modular ramp assembly;

the inclined modular ramp assembly including an unloading end for resting on a tarmac surface with a generally planar conveyance surface extending between the unloading end and the loading end for the sliding conveyance of an article from said loading end to said unloading end;

the inclined modular ramp assembly being disposed near and generally parallel to the auxiliary access stairway; and the inclined modular ramp assembly further including upstanding wall members generally along each edge of the generally planar conveyance surface, the upstanding wall members being means for preventing the sliding article from falling off the generally planar conveyance surface.

2. The baggage slide in accordance with claim 1, wherein the loading end of the inclined modular ramp assembly has side access means for loading the article from the auxiliary access stairway's upper portion landing platform onto the inclined modular ramp assembly.

3. The baggage slide in accordance with claim 2, wherein the side access means for loading the article from the auxiliary access stairway's upper portion landing platform onto the inclined modular ramp assembly includes a first segment for funneling the article to said loading end, the first segment having a width greater than a corresponding width of the unloading end.

4. The baggage slide in accordance with claim 1, wherein the unloading end of the inclined modular ramp assembly has side access means for removing the article from the inclined modular ramp assembly.

5. The baggage slide in accordance with claim 4, wherein the unloading end of the inclined modular ramp assembly further comprises an article stop extending substantially across said inclined modular ramp assembly, said article stop further being located downstream of said side access means for removing the article from the inclined modular ramp assembly.

6. The baggage slide in accordance with claim 5, wherein the article stop is adapted to absorb the impact shock of the sliding article.

7. The baggage slide in accordance with claim 6, wherein the article stop is a rubber reinforced gate.

8. The baggage slide in accordance with claim 1, wherein the generally planar conveyance surface comprises a longitudinally oriented channel corrugated surface defining rain water runoff paths between upper surfaces of the channel corrugated surface.

9. The baggage slide in accordance with claim 8, wherein the longitudinally oriented channel corrugated surface provides for a reduced friction thereby enhancing the sliding of the article down the inclined modular ramp by causing only the upper surface of the longitudinally oriented channel corrugated surface to be in direct contact with the article as the article slides down the inclined modular ramp.

10. The baggage slide in accordance with claim 1, wherein the inclined modular ramp assembly further includes a shell for covering at least a portion of the inclined modular ramp assembly.

11. The baggage slide in accordance with claim 1, wherein the inclined modular ramp assembly comprises one or more segments of predetermined length each.

12. The baggage slide in accordance with claim 11, wherein the one or more segments is adjustable in length so as to maintain a substantially constant ratio between a height of the loading end from the tarmac surface and a length of the inclined modular ramp assembly.

13. The baggage slide in accordance with claim 1, wherein the inclined modular ramp assembly comprises a loading segment, an unloading segment and at least one intermediate segment there between.

14. The baggage slide in accordance with claim 13, wherein the loading segment comprises:

a platform portion; and a connecting portion for connecting the platform portion to the at least one intermediate segment, wherein the platform portion and the connecting portion form an obtuse angle.

15. The baggage slide in accordance with claim 1, wherein the inclined modular ramp assembly comprises a loading segment, an unloading segment and a plurality of intermediate segments there between, the plurality of intermediate segments having at least two different lengths.

16. The baggage slide in accordance with claim 15, wherein the loading segment comprises:

a platform portion; and a connecting portion for connecting the platform portion to the plurality of intermediate segments, wherein the platform portion and the connecting portion form an obtuse angle.

17. The baggage slide in accordance with claim 1, wherein the unloading end further comprises ground engagement wheels coupled to the inclined modular ramp assembly at said unloading end for facilitating ground movement of the baggage slide as the elevated passenger walkway/bridge is maneuvered into position.

18. The baggage slide in accordance with claim 1, further comprising winch means located at the loading end for the controllable lowering of the article down the inclined modular ramp assembly and for the transfer of the article up the inclined modular ramp assembly.

19. The baggage slide in accordance with claim 1, wherein the inclined modular ramp assembly further includes a shell for covering a substantial portion of the inclined modular ramp assembly.

* * * * *